Jan. 13, 1931.　　　　H. C. MEAD　　　　1,788,728
HEAD LAMP FOR VEHICLES
Filed March 12, 1928　　　5 Sheets-Sheet 1
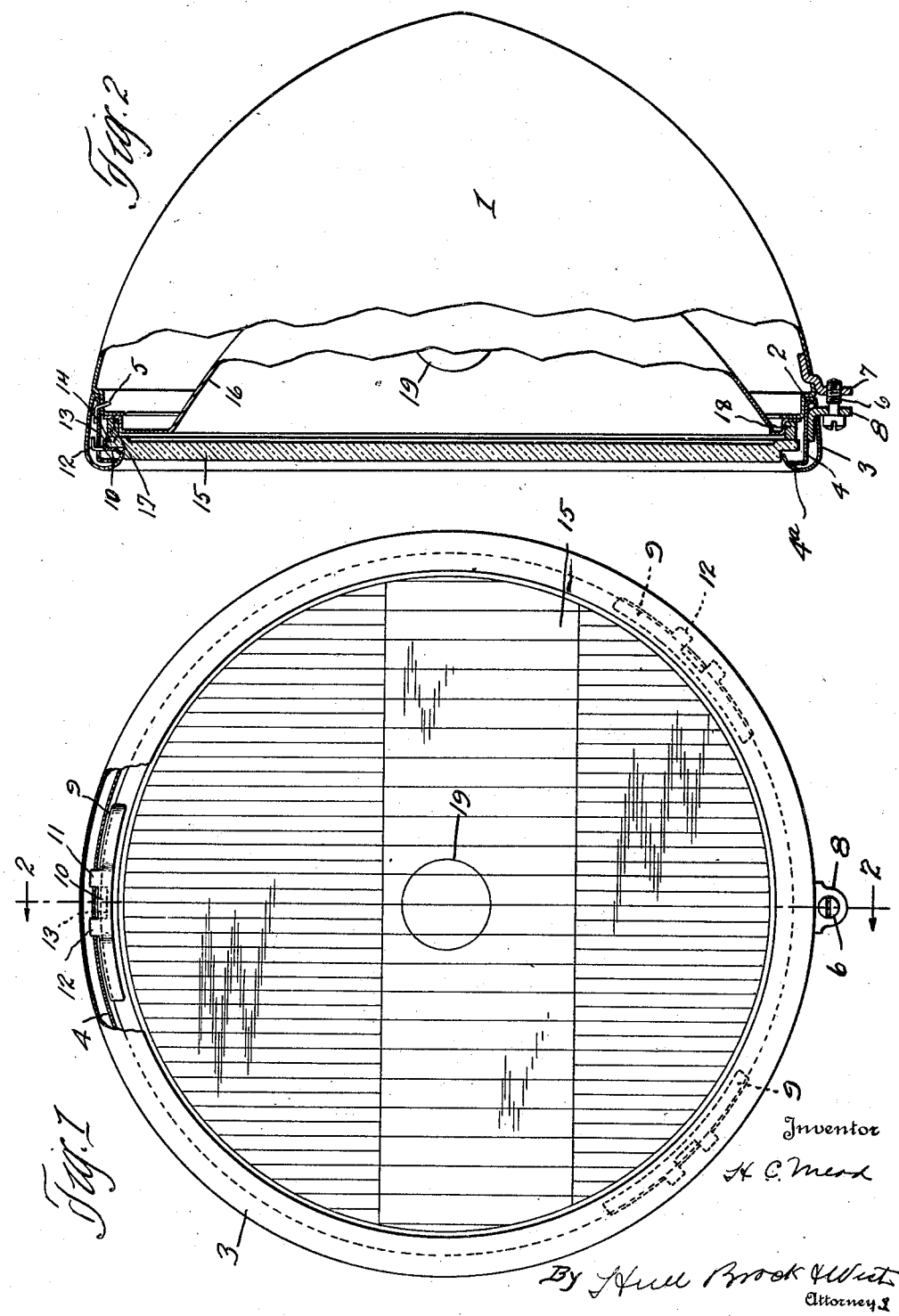

Jan. 13, 1931. H. C. MEAD 1,788,728
HEAD LAMP FOR VEHICLES
Filed March 12, 1928 5 Sheets-Sheet 2
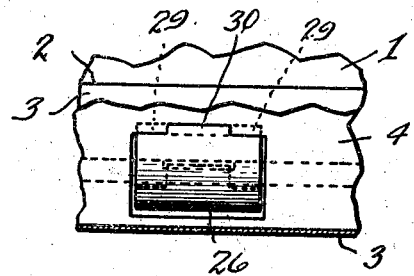
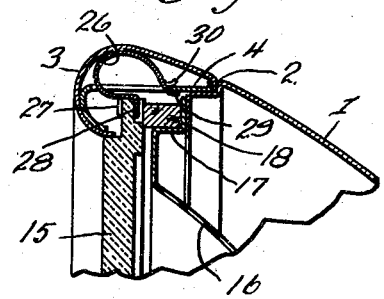
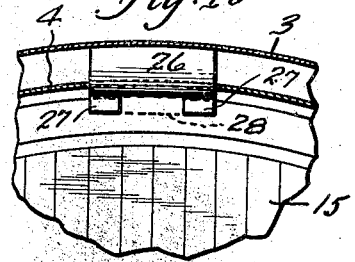
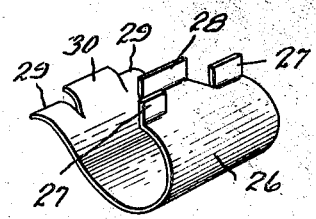
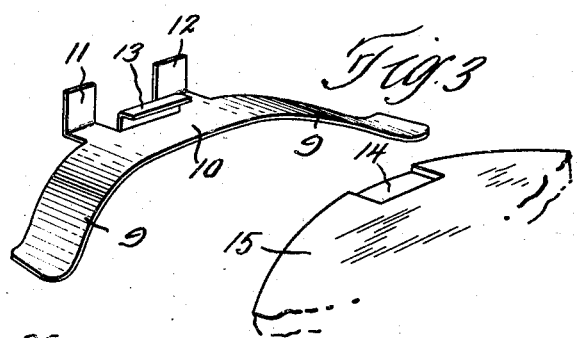
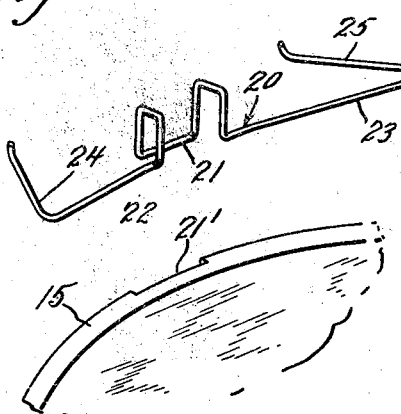

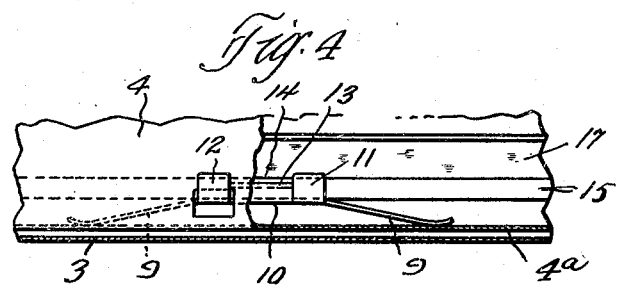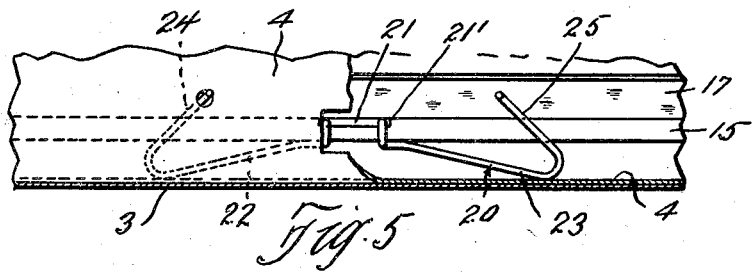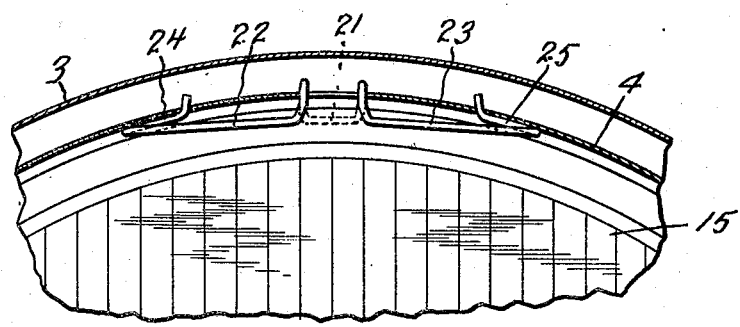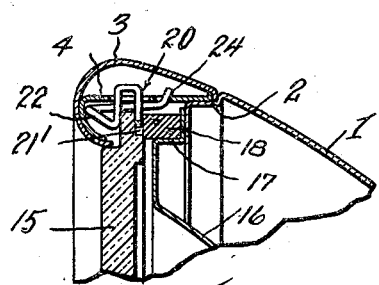

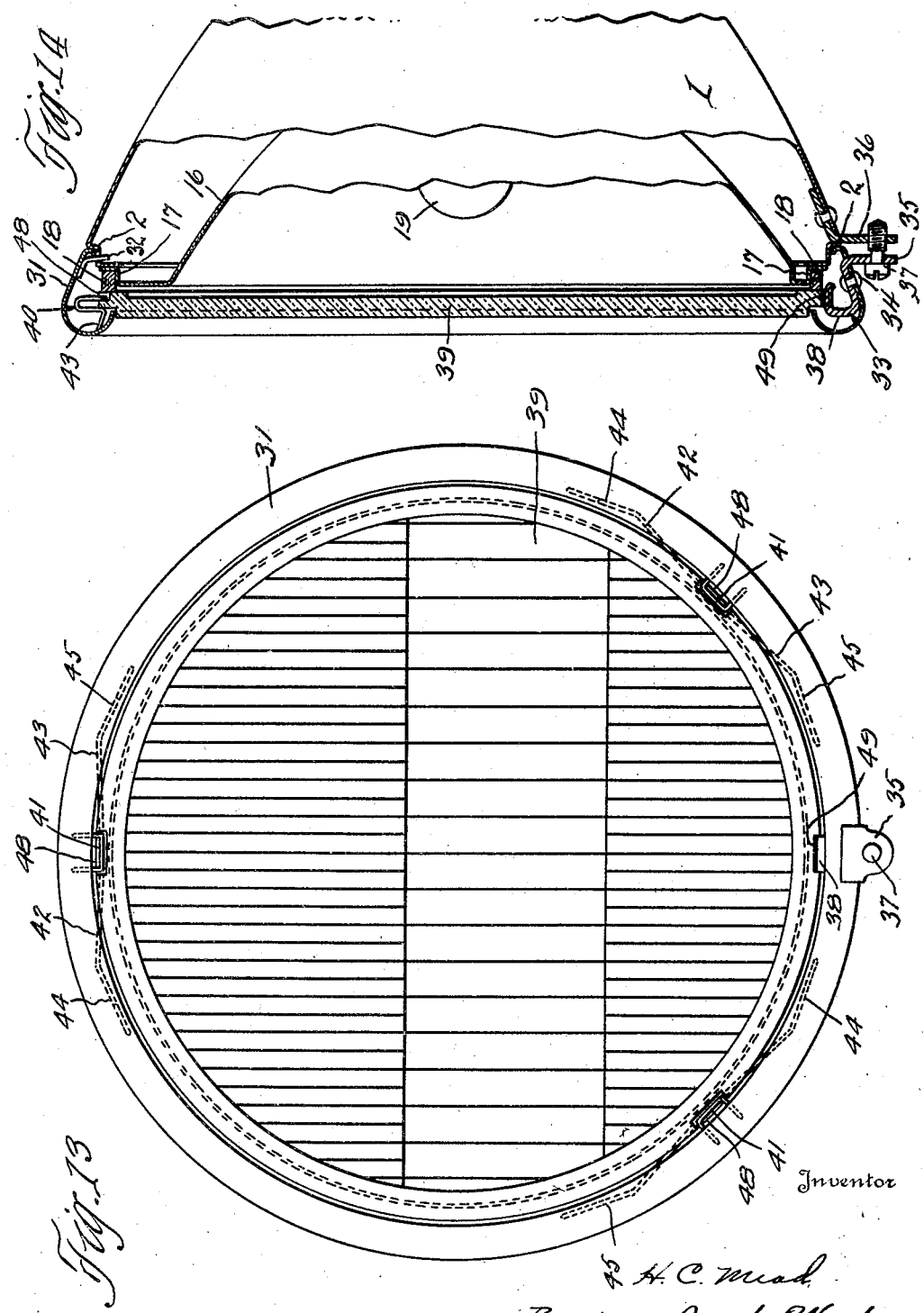

Jan. 13, 1931.   H. C. MEAD   1,788,728
HEAD LAMP FOR VEHICLES
Filed March 12, 1928   5 Sheets-Sheet 5
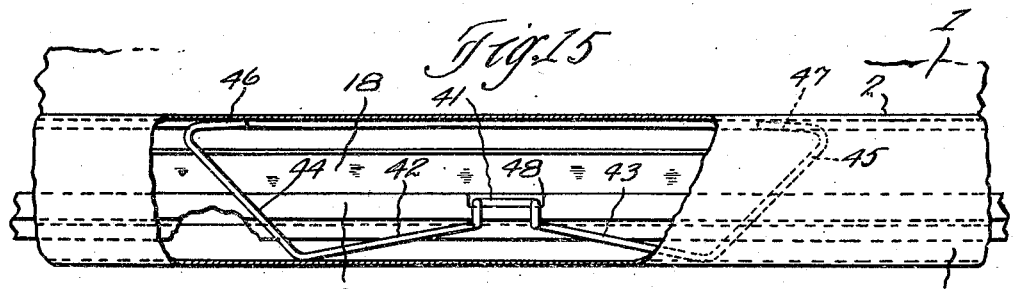
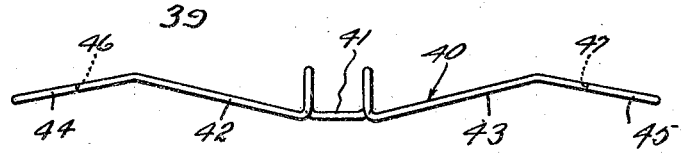
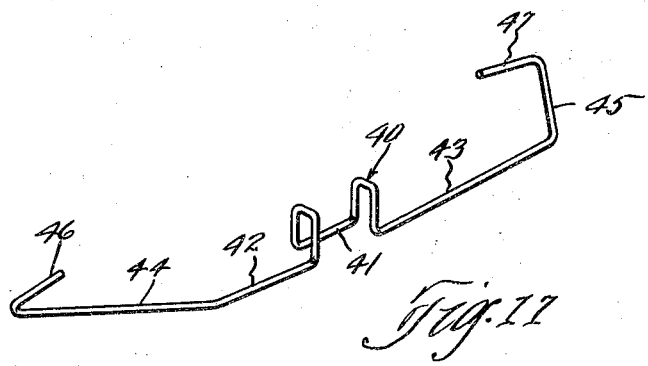
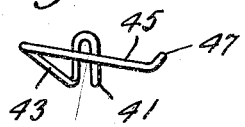

Patented Jan. 13, 1931

1,788,728

UNITED STATES PATENT OFFICE

HOWARD C. MEAD, OF CLEVELAND, OHIO, ASSIGNOR TO DELCO REMY CORPORATION, OF DAYTON, OHIO, A CORPORATION OF DELAWARE

HEAD LAMP FOR VEHICLES

Application filed March 12, 1928. Serial No. 260,915.

This invention relates generally to head lamps for automotive vehicles and particularly to mechanism for resiliently securing the lens within the door or rim of the lamp in such a manner as to allow for manufacturing variations in the contiguous parts and at the same time to prevent warpage of the door or rim.

The type of head lamp in general use today is the butt joint or flush type and in which the rear edge of the door or rim seats against a shoulder provided on the lamp body, the diameters of the door and lamp body at the joint being substantially the same. In this type of construction the door or rim is held to the body by means of a hook or tang projecting from the top of the door and engaging in a slot in the top of the body, the bottom of the door being held by means of a screw threaded into a lug on the lamp body. In all head lamps, it is necessary to provide an effective seal to protect the reflecting surface against corrosion. This seal is ordinarily in the form of an annular cork washer placed between the reflector and lens. In head lamps which do not employ a butt joint construction, the cork seal, being pliable to a certain degree, absorbs or takes up the manufacturing variations in the lens, the door and lamp body. When these variations are additive, the pressure on the cork is of such magnitude that the door distorts or bulges at the sides and when such distortion appears with a butt joint construction, this warpage is noticeable and objectionable from the viewpoint of appearance. It therefore becomes necessary to provide an additional resilient means of some sort which is sufficiently flexible to absorb or allow for these manufacturing variations without the resulting door warpage.

One method in use today employs the floating reflector idea with three springs between the flange of the body and the reflector. It is necessary in this type of construction to fasten the focusing mechanism to the reflector so that the bulb will not be moved out of focus when the door is removed. This is an expensive construction. In some cases where the lens is warped, the reflector will tilt to conform to the angle of lens warpage, which in turn, will move the bulb above, below, or to the side of the focus. This is due to the fact that the reflector being supported by three springs will assume the angle of the lens, but the focus screw being fitted in a hole in the rear of the lamp body cannot follow the angular displacement of the reflector with the result that the entire focusing mechanism is strained and the filament moved out of its proper position. This condition badly distorts the beam of light.

The main object of this invention is to obviate the difficulties hereinbefore mentioned and to compensate for the manufacturing variations while floating the lens in the door, thereby effectively sealing the reflector and preventing the door from warping at the sides.

Another object of the invention is to provide a mechanism of the character set forth which is simple in construction and which is well adapted for quantity production at comparatively low cost.

Further and more limited objects of the invention will appear as the description proceeds and by reference to the accompanying drawings in which Fig. 1 is a view of a front elevation with parts broken away illustrating the manner of attaching the lens to the door or rim; Fig. 2 is a view partly in side elevation and partly in vertical section on the line 2—2 of Fig. 1; Fig. 3 is a detail perspective view illustrating one of the spring members for securing the lens in place; Fig. 4 is a detail fragmentary plan view with the parts broken to more clearly disclose the manner of attaching the spring members to the door rim and lens; Figs. 5, 6 and 7 are detail fragmentary views partly in section and partly in front elevation disclosing a modified form of spring member and the manner of attaching the same to the door or rim of the head lamp; Fig. 8 is a detail perspective view of the form of spring member disclosed in Figs. 5, 6 and 7; Figs. 9, 10 and 11 are detail fragmentary views partly in section and partly in front elevation disclosing a second modified form of spring member for securing the lens within the door rim; Fig. 12 is a detail perspective view of the spring member disclosed in Figs. 9, 10 and 11; Fig. 13 is a view in rear elevation of a modified form of rim with the lens secured therein and disclosing still a different type of spring member for securing the lens in place; Fig. 14 is a fragmentary view partly in vertical section and partly in side elevation disclosing the manner of securing the rim to the head lamp; Fig. 15 is a top plan view of the rim with the lens secured therein and with parts broken away to more clearly illustrate the position of the spring member; and Figs. 16, 17 and 18 are detail views of the spring member used with the form of rim shown in Figs. 13, 14 and 15.

Referring now to the drawings Figs. 1 to 4 inclusive the reference character 1 designates an automobile head lamp of the conventional design and of the butt joint type. The lamp is shaped so as to provide an annular shoulder 2 about the periphery thereof over which fits the door or rim 3. The rim 3 is provided with a lining 4 which is securely held in place by turning the rear edge of the door over the outer edge of the lining, as shown most clearly in Fig. 2.

Secured to the top of the door is a catch or tang 5 which engages in a slot provided in the shoulder 2. The bottom of the lamp is provided with the conventional means of fastening the door to the body which consists of a screw 6 threaded into a lug 7 secured to the lamp body and extending through an aperture member 8 secured to the door. For securing the lens within the door or rim I provide three flat spring members 9 which are placed, one at the top of the rim and the other two at substantially 45° below the horizontal center line of the lamp. One form of spring member is shown in detail in Fig. 3.

Each spring member 9 has an arch-shaped portion 10 and a pair of projections 11 and 12 which extend upwardly therefrom and are adapted to project through slots formed in the door lining 4. Each spring is also provided with an inwardly bent portion 13 which is adapted to engage in a depression 14 formed in the lens 15, as shown most clearly in Figs. 2 and 3. The projections 13 engaging in the depressions 14 prevent rotation of the lens with respect to the door or rim. The arched portion 10 extends a slight distance beyond each side of the depressions and bears against the front side of the lens. The projections or ears 11 and 12 are bent at right angles rearwardly to prevent the spring member from falling out of the door or rim when the same is removed. The center portion 10 of the springs provides a seat for the lens and from this point the springs are bent outwardly at a gently sloping angle. The ends of the spring rest on the radial flange 4a of the door lining. All spring action takes place between the ends of the spring and the lens seat as mostly clearly shown in Fig. 4.

Secured within the body of the lamp is the usual reflector 16 which projects outwardly beyond the plane of the lamp body and is provided with an annular shoulder 17 around which is secured an annular washer or gasket 18. When the door assembly is fastened to the body, it is obvious that the springs will exert a pressure on the lens rearwardly, effectively sealing the reflector, the lens bearing against the washer 18, as shown most clearly in Fig. 2. The reflector is rigidly secured to the body by any suitable means well known to those skilled in the art. The bulb is carried by the reflector and adapted to be adjusted independent of the reflector. Any irregularities or warping of the lens will be absorbed by the springs. Variations in the manufacture in the horizontal direction are compensated for by the springs 9, and due to these springs, the rear edge of the door will fit tightly against the shoulder 2 of the body around the entire outside of the lamp. The springs hold the lens within the door or rim and prevent rotation of the lens with respect thereto and at the same time permit a slight back and forth movement of the lens within the door in a horizontal direction.

In Figs. 5, 6, 7 and 8 I have disclosed a modified form of spring member 20. The spring member 20 is of the wire type as distinguished from the flat type of spring shown in Figs. 1 to 4 inclusive. With the use of these spring members, the principle of floating a lens in the headlight door or rim is the same as described above except that the spring members 20 differ in design and construction. Each spring member 20 is provided with a centrally disposed U-shaped portion 21 and horizontally extending portions 22 and 23. The ends of the spring member 20 are bent rearwardly, as shown at 24 and 25 in Fig. 8. The ends 24 and 25 project through slots provided in the lining 4 as shown most clearly in Figs. 5, 6 and 7. The U-shaped portion 21 engages in a depression 21' in the periphery of the lens as shown in Figs. 7 and 8 and serves to secure the lens within the door or rim. These impressions in the lens also serve to prevent the springs from interfering with the cork gasket thereby preventing destruction of the seal for the reflector. The U-shaped portions of the springs project through openings in the door lining as shown in Figs. 6 and 7 and serve to anchor the lens against rotation with respect to the rim. The springs hold the door assembly intact when removing the door, and should the lens be broken, the springs will not fall out due to their engagement with the door lining. The principle and function of this form of spring member is identical with that described in connection with Figs. 1 to 4 inclusive. This form of spring member is somewhat cheaper in construction and is better adapted for quantity production at low cost than the form of spring member shown in Figs. 1 to 4 inclusive.

In Figs. 9 to 12 inclusive there is disclosed a third form of spring member which is slightly different from the other two forms described but operates on the same principle and accomplishes the same result. This form of spring member consists of a plate 26 which is bent in the shape most clearly shown in Fig. 12. One end of the spring member 26 is provided with a pair of opppositely disposed ears or projections 27 and a centrally disposed ear or projection 28. The opposite end of the spring member 26 is provided with a pair of oppositely disposed projections 29 and a centrally disposed projection 30. The projection 28 engages with the rear side of the lens 15 and the ears 27 engage with the front side of the lens 15, as shown most clearly in Fig. 11. The spring member 26 is arranged within an aperture in the door lining 4 as shown in Fig. 11 and the ears 29 and 30 serve to fasten the same to the door lining 4. This spring member serves the same purpose as the spring members previously described.

Referring now to Figs. 13 to 18 inclusive, there is disclosed a head lamp the front of which is closed by a different type of rim or door, which is preferably made in one piece and has no lining. In this form of the invention the lamp comprises the usual casing 1 of the butt joint type having the annular shoulder 2 and within which is secured the usual reflector 16 having an annular projecting shoulder 17 around which fits the usual annular cork gasket 18. Thus far, this type of head lamp is identical with the head lamp previously described. Instead of the usual rim or door 3 I employ a rim 31 which is provided with a tang or projection 32 which projects through an opening provided in the shoulder 2 adjacent the top thereof. Secured within the rim 31 adjacent the bottom thereof is a lug or clip 33, which is preferably secured to the rim by means of a rivet 34 and which is provided with a portion 35 which extends through the rim as shown most clearly in Fig. 14. Secured within the lamp casing 1 is an apertured member 36 adapted to receive a screw 37 for securing the door in place. The lug or clip 33 is provided at its inner end with an upstanding portion 38 which engages with a recess in the lens and serves to prevent rotation of the lens with respect to the rim 31. Arranged within the rim 31 is a lens 39. For securing the lens 39 within the rim 31 I provide three spring members 40 which are preferably made of wire and are of the shape shown most clearly in Figs. 15 to 18 inclusive. These spring members 40 are placed one at the top of the rim and the other two at substantially 45 degrees below the horizontal center of the lamp as shown most clearly in Fig. 13.

Each spring member 40 comprises a centrally disposed U-shaped portion 41, oppositely disposed forwardly extending portions 42, 43, and rearwardly extending angularly bent portions 44, 45. The portions 44, 45 terminate in angularly bent portions 46 and 47 respectively, which engage behind the curved rear edge of the rim. The lens 39 is provided with spaced cutaway portions or impressions 48 adapted to receive the U-shaped portions 41 of the spring members therein as shown in Fig. 15. These impressed portions in the lens assist in preventing the lens from being turned with respect to the rim and also prevent the U-shaped portion of the spring from interfering with the seal between the lens and the cork gasket 18. The spring members engage behind the curved inner and outer edges of the rim as shown in Fig. 15 and securely hold the lens within the rim. The spring members will not fall out of the rim even should the lens become broken. The lens is also provided at its lower side with a slot 49 into which projects the portion 38 on the lug 33, thereby preventing relative rotation of the lens with respect to the rim. The U-shaped portions of the spring members engage in the impressions as shown most clearly in Figs. 14 and 15 and project outwardly into the rim. This form of spring member performs the same function as the spring members hereinbefore described and is particularly adapted for use with a rim having no lining.

It will now be clear that I have provided a mechanism for resiliently mounting the lens within the door or rim of a head lamp and which will accomplish the objects of the invention as hereinbefore stated. It will also be seen that by floating the lens within the door or rim I provide a construction which will allow for manufacturing variations of the contiguous parts and in which the relative position of the light bulb and reflector will not be disturbed when the rim or door is removed.

Various other forms of spring members and rims are contemplated and within the scope of this invention and it should be understood that the several forms of spring members are shown merely as illustrative and are not to be construed in a limiting sense; and I wish my invention to be limited only in accordance with the scope of the appended claims.

Having thus described my invention, what I claim is:—

1. In a head lamp of the butt joint type, the combination of a lamp body, a reflector arranged within said lamp body and having a gasket extending about the periphery thereof, a rim secured over the front of said lamp body, said rim having a lining, a lens arranged within said rim and a plurality of spring members disposed within said rim, each spring having a pair of projections thereon extending through said lining and being provided with a portion shaped to engage said lens and to hold the lens in place, said lens bearing against said gasket when the rim is secured in place, said springs serving to compensate for manufacturing irregularities in the contiguous parts and preventing warpage of said rim.

2. The combination of a lamp housing, a lens ring fitting and making a joint with the housing, means for locking the ring in closing position on the housing, a reflector in the housing seating against the forward edge thereof, a lens in the ring, a sealing washer interposed between the lens and reflector and spring means mounted in and carried by the lens ring and interposed between the ring and the lens and adapted to normally hold the lens and ring in axially separated relation, and to be stressed upon application of the lens ring to the housing to yieldingly hold the lens in sealing engagement with the washer and reflector.

3. In a lamp, the combination of a lens ring, an annular liner mounted in the ring, and a plurality of circumferentially spaced spring clips detachably secured to the liner and having resilient portions engaging the lens and tending to yieldingly hold the lens and ring separated in an axial direction, said lens having a notch in its periphery, and one of said clips being provided with an indexing portion adapted to enter the notch to prevent rotation of the lens.

4. The combination of a lamp housing having a reduced portion at its forward end, a lens ring fitting the reduced portion and forming a slip joint with the housing, means for fastening the lens ring to the housing, a reflector in the housing, a lens in the lens ring, an annular sealing gasket between the reflector and lens, an annular liner secured in the ring, and a plurality of circumferentially spaced spring clips secured to the liner and having portions for holding the lens in the ring, said clips being flexed upon application of the ring to the housing to yieldingly hold the lens against the gasket and reflector to seal the lamp.

In testimony whereof, I hereunto affix my signature.

HOWARD C. MEAD.